Feb. 20, 1923.
F. A. ADAMS.
COUPLING DEVICE.
FILED JULY 5, 1921.
1,446,143.
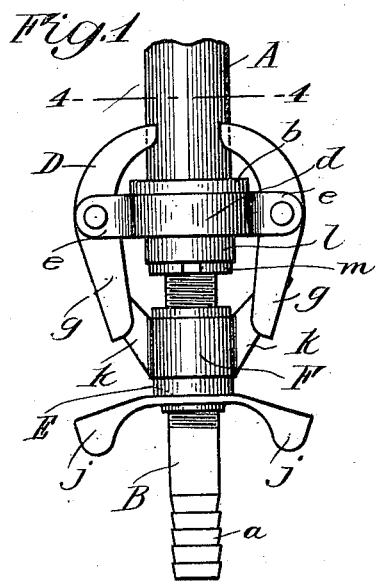
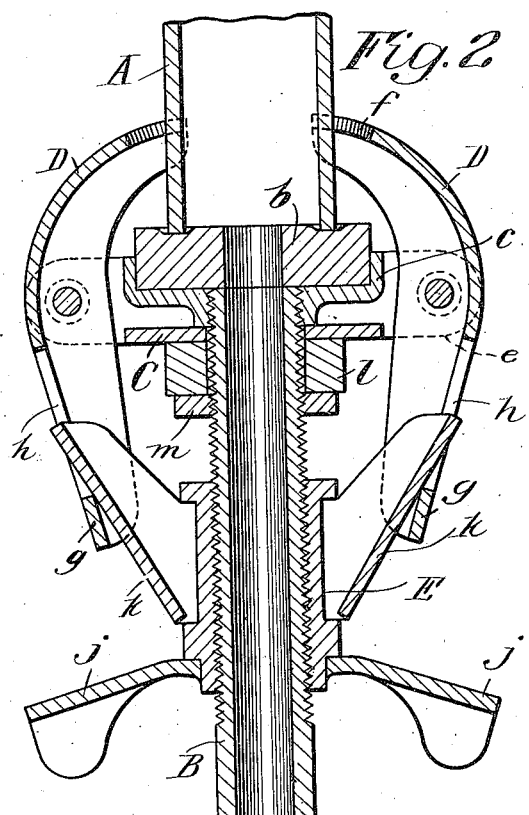
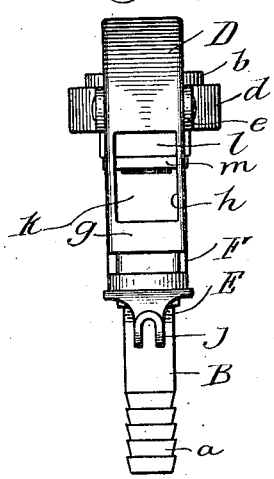
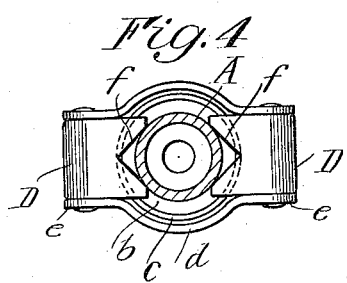
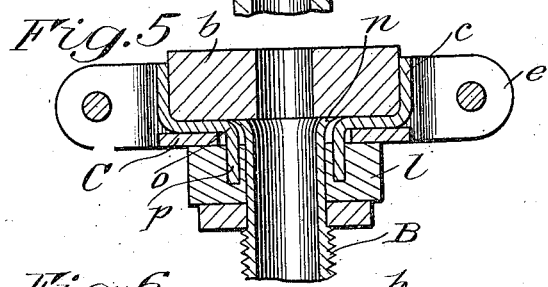
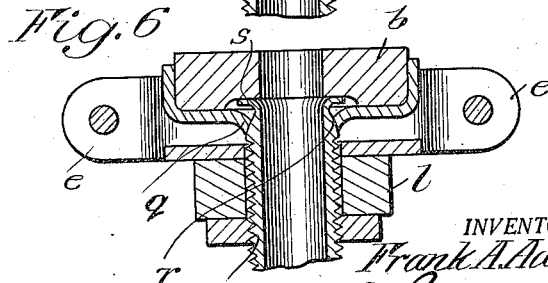
INVENTOR.
Frank A. Adams
BY Harold R. Stonebraker
his ATTORNEY Patented Feb. 20, 1923.

1,446,143

UNITED STATES PATENT OFFICE.

FRANK A. ADAMS, OF ROCHESTER, NEW YORK, ASSIGNOR TO BURT C. OLNEY, OF ROME, NEW YORK, AND FLORENCE C. DAILEY, OF ROCHESTER, NEW YORK.

COUPLING DEVICE.

Application filed July 5, 1921. Serial No. 482,449.

*To all whom it may concern:*

Be it known that I, FRANK A. ADAMS, a citizen of the United States of America, and residing at Rochester, in the county of Monroe and State of New York, have invented certain new and useful Improvements in Coupling Devices, of which the following is a specification.

My invention relates to a coupling device, and is more particularly intended to be used as a quickly detachable connection between two pipes, or between a flexible tube and a pipe, as for instance where it is desired to connect a rubber tube on the end of a faucet.

A principal object of the invention is to provide a simple and practical mechanism which can be economically manufactured, and efficiently accomplishes the intended purposes.

A further object of the improvement is to provide a construction that insures gripping the end of a pipe tightly, and which also effects a close, watertight connection between the faucet and the tube that is connected thereto.

An additional purpose of the invention is to provide a construction that lends itself readily to quick and easy attachment, and which also accommodates itself without difficulty to various types of faucets, including those in which the end surface of the faucet is disposed at other than a right angle to the longitudinal axis thereof, the seat of the coupling device adjusting itself automatically to such end of a faucet.

Other objects and advantages of the improvement will appear from the following detailed description, in conjunction with the accompanying drawing, the novel features being pointed out in the claims following the description.

In the drawing:

Figure 1 is a side elevation showing a preferred embodiment of the invention as applied in actual use to a faucet;

Figure 2 is an enlarged vertical sectional view of the same;

Figure 3 is a side elevation of the parts illustrated in Figure 1;

Figure 4 is a horizontal sectional view on line 4—4 of Figure 1;

Figure 5 is an enlarged sectional view of a modified form of seat construction, and Figure 6 is an enlarged sectional view of still a further modification of seat construction.

Referring more particularly to the drawing, which illustrates one of the various possible practical adaptations of the invention, A designates the end of a pipe or faucet with which the connection is to be made.

The invention, in the structure shown, includes a rod-like member, specifically a tubular metal support in the form of a pipe B, having the corrugated end $a$ to receive a rubber tube or similar flexible connection. The tubular support B is provided with a seat for engaging the faucet A, and in the form illustrated in Figure 2, said seat consists of a washer $b$ of rubber or similar material mounted in a cup $c$, which latter is threaded on the end of the tubular support B.

Arranged beneath the cup $c$, and loosely secured on the tubular support B, is a carrier, preferably in the form of a plate C, which carries the gripping devices that engage the faucet and retain the coupling in place. The plate C includes upstanding wall $d$ which extend outwardly, forming ears $e$, between which the gripping devices D are pivoted. The gripping devices consist of lever arms terminating at one end in V-shaped jaws $f$, adapted to engage a faucet nozzle, as shown in Figure 4, and having at their other ends tail portions $g$, by which the gripping devices are operated or released. To accomplish this end, the tail portions $g$ are cut away to afford openings $h$, for a purpose that will now appear.

A preferred form of actuating means is the mechanical advantage device shown, which comprises a sleeve E threaded for longitudinal adjustment on the support B, and having fixedly secured thereon an operating member with finger-pieces $j$, by which the sleeve E is rotated to adjust it longitudinally on the support B. The sleeve E has swiveled thereon a collar F including cam members or arms $k$, which enter the openings $h$ and engage the tail portions $g$. Positioned against the carrier plate C is a washer $l$ of rubber or other similar resilient material, while $m$ is a nut threaded on the support B and positioned against the washer *l* so as to hold the carrier C in normal position.

In the operation of the form of the device thus far described, the coupling is positioned with the jaws *f* against the sides of the faucet, as shown in Figures 1, 2 and 3, and the finger portions *j* are then turned. This rotates the sleeve E, moving it downwardly with reference to Figure 2, and through the cam members *k*, forcing the tail portions *g* outwardly, and the gripping members or jaws *f* inwardly. This operation continues until the jaws are in tight engagement with the faucet, and the tail portions *g* can then move no further. Further turning of the sleeve E then causes the tubular support B, and its seat *b*, to move slightly upwardly, thus forcing the seat into tight engagement with the end of the faucet. The parts are released by turning the finger portions, *j*, and the sleeve E in the opposite direction to that already described.

While in some cases it is practicable to mount the cup *c* fixedly at the end of the tubular support B, it is preferable to provide a slight universal relative motion between these parts in order to accommodate a faucet or pipe where the end is disposed at other than a right angle to the longitudinal axis of the faucet, as happens in many basin fittings, where the faucet is inclined to the vertical, although its end is in a horizontal plane. This result is attained by the modified arrangements shown in Figures 5 and 6.

In Figure 5, the tubular support B has its upper end *n* spun over to afford a lip overlying the adjacent surface *o* of the cup, which is bent downwardly to afford a collar *p* that enters the rubber washer *l*, and lies in spaced relation to the tubular support B. With this construction, the cup which carries the seat *b* is held on the tubular support B, but can yield with reference thereto in various directions. In this form of the device, the carrier plate C is arranged between the cup and the washer *l*, as in the previously described construction.

Still another method of accomplishing this is illustrated in Figure 6, where the rubber seat *b* is mounted in a cup having a downwardly and inwardly curved flange *q* which engages a curved surface *r* formed on the tubular support B. The latter has a lateral flange *s* formed at its upper end, which overlies the flange *q* and prevents separation of the parts, although permitting a relative universal yielding motion. The rubber seat *b* is recessed at its bottom to accommodate the flange *s*.

The invention may be modified in other respects in addition to what I have described, without departing from the fundamental characteristics, and this application is intended to cover any departures from the specific disclosure set forth, that may come within the intended purpose of the improvement and the scope of the following claims.

I claim:

1. The combination with a tubular support provided with a seat for engaging the end of a pipe, of a carrier mounted on the tubular support and having movement relatively thereto, gripping devices movably arranged on the carrier, and actuating means adjustable on the support and cooperating with said gripping devices.

2. The combination with a tubular support provided with a seat for engaging the end of a pipe, of a carrier mounted on the tubular support and having movement relatively thereto, gripping devices pivoted on the carrier, and actuating means having threaded engagement with the support and operatively connected with said gripping devices.

3. The combination with a tubular support, of a seat mounted at the end of the support and having a slight universal movement relatively thereto, of a carrier mounted on the tubular support and having movement relatively thereto, gripping devices movably arranged on the carrier, and actuating means adjustable on the support and cooperating with said gripping devices.

4. The combination with a tubular support provided with a seat for engaging the end of a pipe, of a carrier mounted on the tubular support and having longitudinal movement relatively thereto, gripping jaws pivotally mounted on the carrier and including operating portions, and actuating means adjustable on the support and engaging with said operating portions.

5. The combination with a tubular support provided with a seat for engaging the end of a pipe, of a carrier mounted on the tubular support and having longitudinal movement relatively thereto, gripping jaws pivotally mounted on the carrier and including operating portions, actuating means comprising a sleeve threaded on the support, and cam members mounted on the sleeve and engaging said operating portions of the gripping jaws.

6. The combination with a tubular support, of a seat mounted at the end of the support and having a slight universal movement relatively thereto, of a carrier mounted on the tubular support and having longitudinal movement relatively thereto, gripping jaws pivotally mounted on the carrier and including operating tail portions having openings therein, actuating means comprising a sleeve threaded on the support, and a collar rotataively mounted on the sleeve and having cam members entering said openings and engaging the tail portions of the gripping jaws.

7. In a coupling, opposed gripping means adapted to move relatively toward or from each other to engage a pipe, a tubular member having one end adapted to abut and form a continuation of said pipe, and a mechanical advantage device engaging said tubular member and said gripping means in such manner as to apply a mutually reacting force tending to move them substantially at right angles to each other.

8. In a coupling, gripping means comprising pivoted arms terminating in opposite jaws relatively movable toward and from each other, a threaded rod-like member, a threaded sleeve engaging said threaded member, means swiveled on the sleeve about its axis engaging the pivoted arms in such relation that movement of the sleeve longitudinally of the rod-like member causes a relative movement of said jaws with respect to each other.

In witness whereof, I have hereunto signed my name.

FRANK A. ADAMS.